No. 680,848. Patented Aug. 20, 1901.
W. ERNY.
ZINC ELECTRODE FOR ELECTRIC BATTERIES.
(Application filed Mar. 6, 1901.)

(No Model.) 2 Sheets—Sheet 1.

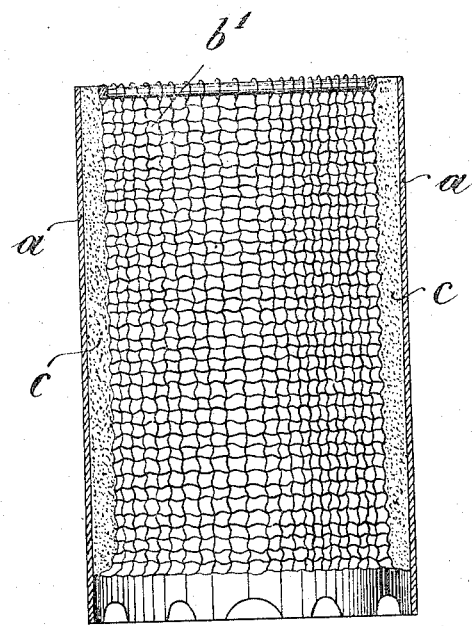

UNITED STATES PATENT OFFICE.

WILHELM ERNY, OF HALLE-ON-THE-SAALE, GERMANY.

ZINC ELECTRODE FOR ELECTRIC BATTERIES.

SPECIFICATION forming part of Letters Patent No. 680,848, dated August 20, 1901.

Application filed March 6, 1901. Serial No. 50,081. (No model.)

*To all whom it may concern:*

Be it known that I, WILHELM ERNY, electrical engineer, a subject of the Emperor of Germany, and a resident of Blücherstrasse 10, Halle-on-the-Saale, in the Kingdom of Prussia and Empire of Germany, have invented certain new and useful Improvements in Zinc Electrodes Comprising Spongy Zinc Amalgam for use in Electric Batteries, of which the following is a specification.

The present invention relates to a new zinc electrode.

Figure 1:
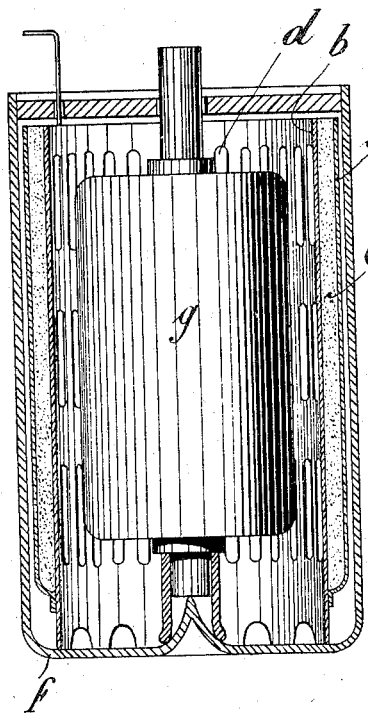

The said zinc electrode consists of spongy zinc amalgam, which is either placed between two concentric zinc cylinders or covers the interior of a zinc cylinder or is held upon the side of such a support by other suitable retaining means—such, for instance, as a zinc-wire network. The first case is illustrated by Figure 1 of the annexed drawings, the second case by Fig. 2, each of which figures represents a longitudinal section of an electric battery provided with a zinc electrode of the kind referred to. The third case is illustrated by the fragmentary sectional view, Fig. 3. A modified construction of retaining means for the zinc filling is shown in Fig. 3.

The manner in which the said zinc electrode is produced is as follows: In the case of the electrode shown in Fig. 1 two zinc cylinders $a$ and $b$ are placed together concentrically and connected at their lower ends, thus forming an annular space $c$, closed at the bottom. The inner zinc cylinder $b$ is provided with holes $d$ of any shape. Instead of the inner cylinder $b$, however, a netting $b'$, Fig. 3, made of zinc wire or the like, may be used. Zinc-filings and mercury are then mixed together with some acid—for instance, muriatic acid—preferably in the following proportions: eighty parts of zinc-filings, ten parts of mercury, and ten parts of muriatic acid, 10° Baumé. The purpose of the acid is to cleanse the zinc-filings of fatty matter and to produce a close combination of same with the mercury. When this has been done, the mixture of zinc-filings and mercury is washed in pure water in order to free it of the muriatic acid—that is to say, to wash out the muriatic acid again. When the amalgam has been thus far prepared, the surfaces of the zinc cylinders $a$ and $b$, connected together at their lower ends, are cleansed, for instance, by dipping the said cylinders into muriatic acid. When this has been done, the space $c$ is filled with the zinc amalgam described. The latter passes through the holes $d$ and also covers the inner surface of cylinder $b$, which is turned toward the carbon electrode. At the same time the zinc amalgam enters into close connection with the two cylinders.

Figure 2:
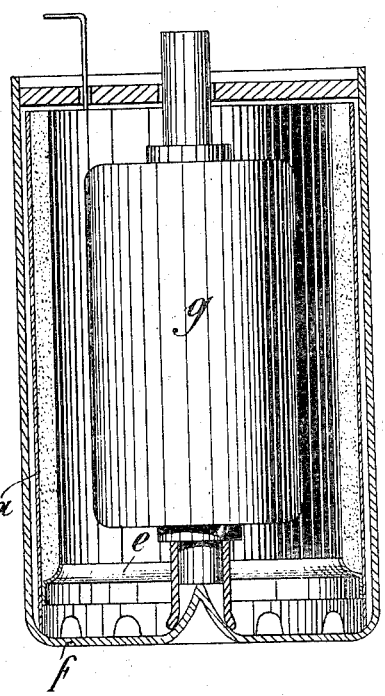

In the case represented in Fig. 2 only one zinc cylinder $a$ is used, the inside of which is covered with the zinc amalgam described. To prevent the latter from sliding down, the lower end of the said cylinder may be provided with a flange $e$, projecting inwardly. When the zinc electrode has been prepared in one of the forms shown in Figs. 1 and 2, a carbon $g$ is placed in the cell $f$, and into the latter is placed electrolyte of the following composition: thirty to forty parts of ammonium chlorid, twenty to thirty parts of chlorid of calcium, fifteen to twenty-five parts of barium peroxid, five to twelve parts of chlorid of barium, three to eight parts of hydrogen peroxid, and water. When the electrolyte has been put into the cell, the zinc electrode prepared in the manner described is placed into the latter, and the battery is made to work, either by taking it into use or making frequently short circuits. During the action of the battery the electric current and the polarization current convert the zinc amalgam into a spongy condition, in which it forms a firm sponge-like mass. Owing to the now porous structure of the zinc amalgam, which is opposite the carbon electrode $g$, the active surface of the zinc electrode is very large, and the efficiency of the electric battery is consequently considerably increased.

Compared with other zinc electrodes the process of the destruction of the zinc electrodes described, by the action of the electrolyte, is very slow. In the case of the zinc electrode represented in Fig. 1, comprising two cylinders, one placed within the other, after the spongy zinc amalgam on the inside of the inner cylinder $b$ has been used up, the cylinder $b$ itself, which has in the meantime also become porous to a certain extent, comes into action, and, lastly, the spongy amalgam in the space $c$ is used.

In using the new zinc electrode for dry batteries some substance is added to the electrolyte to convert same into a gelatin-like mass. For this purpose starch, gelatin, or the like may be used.

Having thus described my invention, the following is what I claim as new therein and desire to secure by Letters Patent:

1. A porous zinc electrode for electric batteries consisting of a zinc cylinder, a spongy-zinc-amalgam filling applied to the side of said cylinder in mass, and a perforate retaining medium of zinc holding the amalgam to the zinc cylinder, as explained.

2. An electric cell comprising a zinc cylinder, an amalgam of zinc-filings and mercury applied to the surface of said zinc cylinder, a perforated zinc retaining-wall for holding the amalgam to the zinc cylinder, a suitable container in which the electrode thus produced is introduced, an electrolyte which, under the action of an electric current will convert the amalgam into spongy zinc, and a coöperating electrode also introduced into said cell, substantially as set forth.

3. An electric cell containing a suitable container; an electrode composed of a zinc cylinder, an amalgam of zinc-filings and mercury applied to the surface of said zinc cylinder, and a concentric perforated zinc cylinder holding the amalgam to the cylinder first named; an electrolyte composed of ammonium chlorid, chlorid of calcium, barium peroxid, chlorid of barium, hydrogen peroxid and water, together with a suitable substance reducing the electrolyte to a jelly-like mass.

4. An electrode for electric batteries comprising a body of zinc, a spongy zinc amalgam applied thereto, in substantially the manner described, and a retaining structure of zinc conforming to the body of zinc, securing the spongy zinc amalgam thereto, and having openings permitting access of the electrolyte to the spongy zinc amalgam.

5. An electrode for electric batteries comprising two concentric zinc supporting-cylinders, and a spongy zinc amalgam filling the annular space between said cylinders; the cylinder nearest the other electrode of the battery, being apertured to give the electrolyte access to the spongy zinc amalgam.

6. An electric battery containing as one of its elements a zinc electrode composed of a zinc support, an amalgam of zinc-filings and mercury secured thereon, and an electrolyte in the presence of which under galvanic action converts the zinc amalgam into spongy zinc, substantially as set forth.

In witness whereof I have hereunto set my hand in presence of two witnesses.

WILHELM ERNY.

Witnesses:
HENRY HASPER,
WOLDEMAR HAUPT.